(12) United States Patent
Giulietti

(10) Patent No.: US 10,399,146 B2
(45) Date of Patent: Sep. 3, 2019

(54) CONTOUR SCANNING FOR ADDITIVE MANUFACTURING PROCESS

(71) Applicant: Hamilton Sundstrand Corporation, Charlotte, NC (US)

(72) Inventor: Diana Giulietti, Tariffville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 694 days.

(21) Appl. No.: 14/993,684

(22) Filed: Jan. 12, 2016

(65) Prior Publication Data

US 2017/0197248 A1 Jul. 13, 2017

(51) Int. Cl.
| | |
|---|---|
| *B22F 3/105* | (2006.01) |
| *B29C 67/00* | (2017.01) |
| *B33Y 10/00* | (2015.01) |
| *B33Y 30/00* | (2015.01) |
| *B33Y 50/02* | (2015.01) |
| *B29C 64/153* | (2017.01) |
| *B29C 64/393* | (2017.01) |

(52) U.S. Cl.
CPC .......... *B22F 3/1055* (2013.01); *B29C 64/153* (2017.08); *B29C 64/393* (2017.08); *B33Y 10/00* (2014.12); *B33Y 30/00* (2014.12); *B33Y 50/02* (2014.12); *B22F 2003/1056* (2013.01); *B22F 2003/1057* (2013.01); *B22F 2999/00* (2013.01); *Y02P 10/295* (2015.11)

(58) Field of Classification Search
None
See application file for complete search history.

(56) References Cited

U.S. PATENT DOCUMENTS

| | | | |
|---|---|---|---|
| 5,837,960 | A | 11/1998 | Lewis et al. |
| 6,465,757 | B1 | 10/2002 | Chen |
| 6,676,892 | B2 | 1/2004 | Das et al. |
| 2004/0217095 | A1 | 11/2004 | Herzog |
| 2009/0206065 | A1 | 8/2009 | Kruth |
| 2014/0163717 | A1 | 6/2014 | Das |
| 2015/0048064 | A1 | 2/2015 | Cheverton et al. |

(Continued)

FOREIGN PATENT DOCUMENTS

| | | |
|---|---|---|
| WO | 2014176536 A1 | 10/2014 |
| WO | 2014179679 A1 | 11/2014 |
| WO | 2015053946 A1 | 4/2015 |

OTHER PUBLICATIONS

Search Report regarding related GB App. No. GB1700452.4; dated Apr. 7, 2017; 3 pgs.

*Primary Examiner* — Colin W. Slifka
(74) *Attorney, Agent, or Firm* — Cantor Colburn LLP

(57) ABSTRACT

A method of making an article is disclosed in which a fusible material is fused with an energy beam applied to the fusible material at a build location with a scanning pattern comprising a plurality of parallel lines terminating at the contoured edge. An energy beam is also applied with a vector scanning pattern at the build location along the contoured edge to liquefy and re-solidify material at the build location along the contoured edge. The method also includes controlling vector scanning energy beam intensity, vector scanning energy beam scanning speed, vector scanning energy beam focus depth, or any combination thereof as a function of an angle between the plurality of parallel lines and the vector along the contoured edge.

20 Claims, 3 Drawing Sheets

(56) References Cited

U.S. PATENT DOCUMENTS

2016/0052087 A1\* 2/2016 O'Neill ............... B23K 26/342
  419/7
2016/0344948 A1 11/2016 Bamberg et al.

\* cited by examiner

CONTOUR SCANNING FOR ADDITIVE MANUFACTURING PROCESS

BACKGROUND

The described subject matter relates generally to the field of additive manufacturing. In particular, the subject matter relates to operating an energy beam to facilitate additive manufacturing.

Additive manufacturing refers to a category of manufacturing methods characterized by the fact that the finished part is created by layer-wise construction of a plurality of thin sheets of material. Additive manufacturing may involve applying liquid or powder material to a workstage, then doing some combination of sintering, curing, melting, and/or cutting to create a layer. The process is repeated up to several thousand times to construct the desired finished component or article.

Various types of additive manufacturing are known. Examples include stereo lithography (additively manufacturing objects from layers of a cured photosensitive liquid), electron beam melting (using a powder as feedstock and selectively melting the powder using an electron beam), laser additive manufacturing (using a powder as a feedstock and selectively melting the powder using a laser), and laser object manufacturing (applying thin solid sheets of material over a workstage and using a laser to cut away unwanted portions).

Many additive manufacturing processes utilize a scanning energy beam to fuse a fusible material. Scanning is commonly implemented in a raster scanning mode where a plurality of substantially parallel scan lines are used to form a layer of a complete article or section of an article. The parallel scan lines terminate along a contoured edge that is smoothed by applying the energy beam in a vector scanning mode along the contoured edge.

BRIEF DESCRIPTION

According to some embodiments of this disclosure, a method of making an article comprises fusing a fusible material with an energy beam applied to the fusible material at a build location with a scanning pattern comprising a plurality of parallel lines terminating at the contoured edge. An energy beam is also applied with a vector scanning pattern at the build location along the contoured edge to liquefy and re-solidify material at the build location along the contoured edge. The method also includes controlling vector scanning energy beam intensity, vector scanning energy beam scanning speed, vector scanning beam focus depth, or any combination thereof as a function of an angle between the plurality of parallel lines and the vector along the contoured edge.

According to some embodiments of this disclosure, an additive manufacturing apparatus comprises a build location for a fusible material, an energy beam scanning emitter, and a controller in communication with the energy beam scanning emitter. The controller is configured to apply an energy beam from the energy beam scanning emitter to the fusible material at the build location with a scanning pattern comprising a plurality of parallel lines terminating at a contoured edge. The controller is also configured to apply an energy beam with a vector scanning pattern at the build location along the contoured edge, and to control vector scanning energy beam intensity, vector scanning energy beam scanning speed, vector scanning beam focus depth, or any combination thereof as a function of an angle between the plurality of parallel lines and the vector along the contoured edge.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
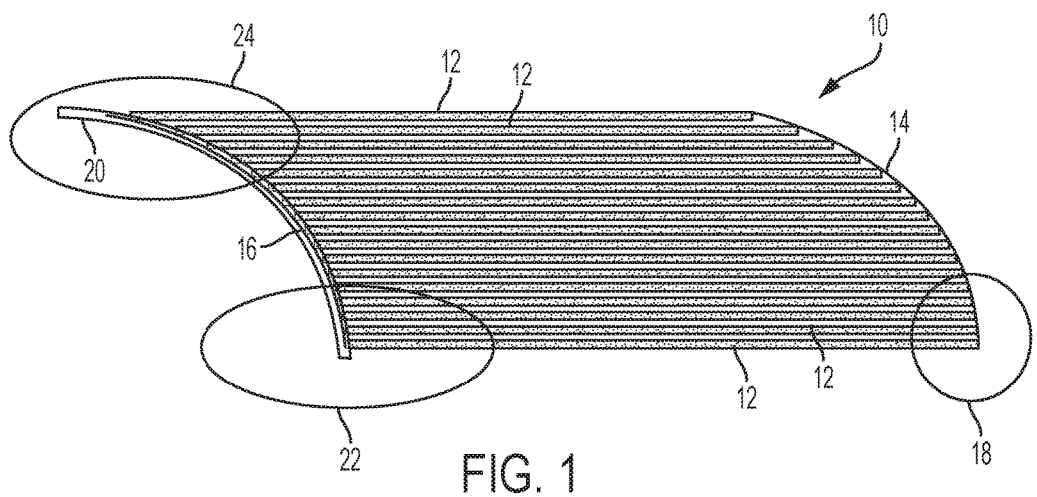
FIG. 1 is a schematic depiction of an example embodiment of an energy beam scanning pattern in an additive manufacturing process.
Figure 2:
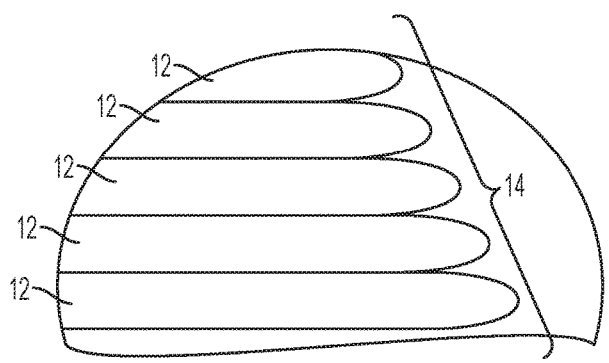
FIG. 2 is a schematic depiction of a magnified edge portion of a fabricated layer scanned with the pattern of FIG. 1.

With reference to the figures, FIG. 1 depicts a scanning pattern 10 of parallel scan lines 12, also sometimes referred to as a raster scanning pattern. Typically, additive manufacturing processes scan across a layer of fusible material representing a cross-sectional virtual slice through an article being manufactured. As shown in FIG. 1, the parallel scan lines 12 terminate along contoured edges 14 and 16. In some embodiments, contoured edges along which raster scanning lines terminate in additive manufacturing processes can occur along surface sections of the article being manufactured. In some embodiments, the layer of the article being manufactured is divided into segments, with the segments subjected to scanning one at a time, and contoured edges can also occur along the edges of such segments. A region 18 of the scanning pattern 10 is depicted in a magnified view in FIG. 2. As shown in FIG. 2, the contoured edge has a rough finish derived from the terminus of the scan lines 12 at the contoured edge. It is noted that the scan lines 12 in FIGS. 2, 3, and 4 also schematically depict the size or proportions of the fused material resulting from exposure to the energy beam. Contour edge roughness such as depicted in FIG. 2 can require post-production finishing in the case of a surface portion of the article being manufactured or can cause a rough internal seam with sub-surface porosity in the case of an internal segment boundary. Accordingly, as shown in FIG. 1, an energy beam applied is with a vector scan line 20 to liquefy material at the build location along the contoured edge 16. Liquefaction and re-solidification of material can smooth the roughness along the contoured edge.

Figure 3:
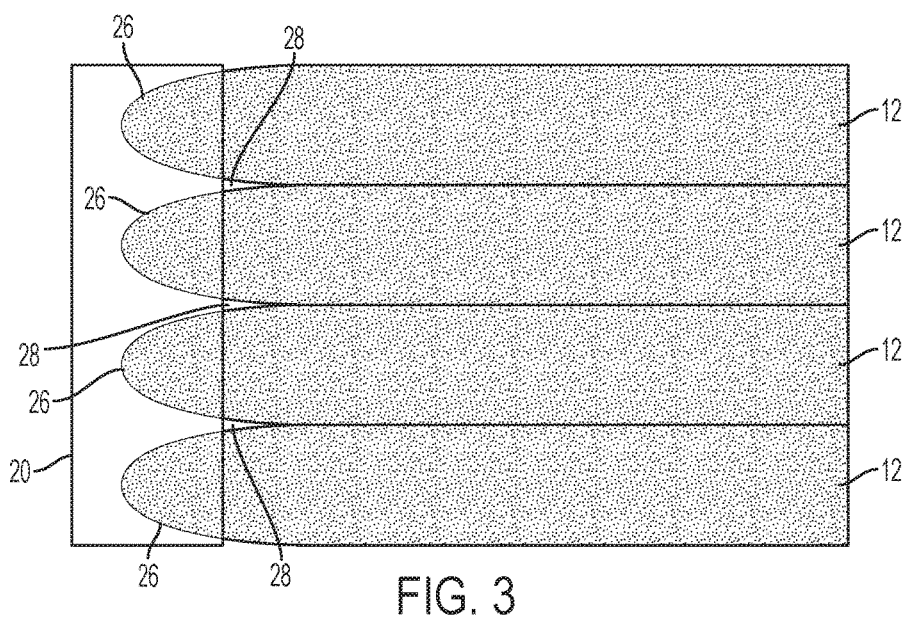
FIG. 3 is a schematic depiction of another magnified edge portion of a fabricated layer scanned with the pattern of FIG. 1.
Figure 4:
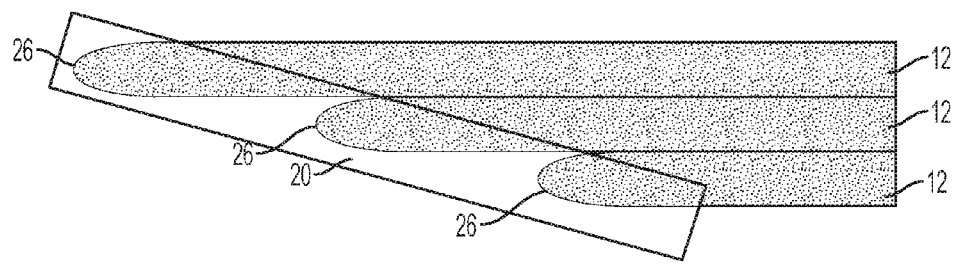
FIG. 4 is a schematic depiction of another magnified edge portion of a fabricated layer scanned with the pattern of FIG. 1.

As described above, a method of additive manufacturing comprises controlling vector scanning energy beam intensity, vector scanning energy beam scanning speed, vector scanning energy beam focus depth, or any combination thereof as a function of an angle between the plurality of parallel lines and the vector along the contoured edge. For a curved contour edge, the vector along the contour edge will typically be a line tangential to the curved contour edge at the point of intersection between the energy beam and the build location. For a curved contour edge, or for a contour edge having any change in angle between the parallel scan lines and the contour edge, this will involve dynamic control of vector scanning energy beam intensity, vector scanning energy beam scanning speed, vector scanning energy beam focus depth, or any combination thereof. The size of the melt zone (also known as a melt pool) resulting from the vector scanning along the contour edge without controlling beam intensity, speed, or focal depth is shown in FIGS. 3 and 4, with FIG. 3 depicting a magnified view of region 22 and FIG. 4 depicting a magnified view of region 24. The scan line 20 in FIGS. 1, 3, 4, and 5 (scan line 20a) also depict the relative size of a melt pool resulting from vector scanning along the contour edge. As shown in FIGS. 3 and 4, the melt pool of vector scan line 20 is centered on the tips 26 of the scan lines 12. As shown in FIG. 4, when the angle between the scan lines 12 and the vector scan line 20 is relatively small, the melt pool extends relatively far into the area of scan lines 12, compared to FIG. 3 where the angle between the scan lines 12 and the vector scan line 20 is relatively large. This extension of liquefaction into the area of scan lines 12 can in some embodiments result in thickening of the material along the contour edge, which can require post-process finishing for article surface portions, or geometry mismatch or risk of collision with additive manufacturing machine components such as the roller. In the region 22 depicted in FIG. 3, on the other hand, there is a smaller degree of overlap between the melt pool of vector scan line 20 and the area of scan lines 12. However, as shown in FIG. 3, sections 28 between the fusion zones of scan lines 12 are left unscanned or partially scanned by both the raster scan lines 12 and the vector scan line 20, which can result in sub-surface porosity leading weak areas in the finished article.

Figure 5:
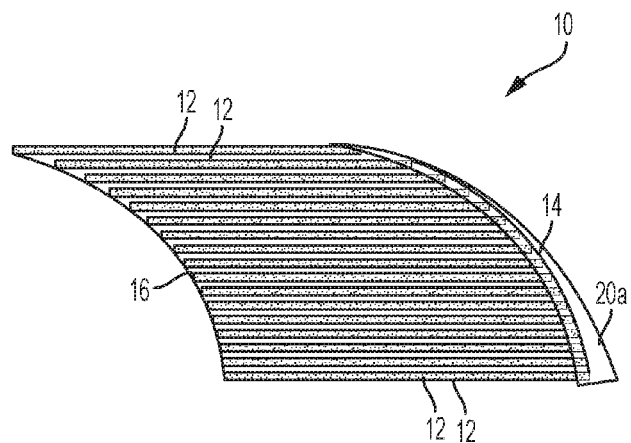
FIG. 5 is a schematic depiction of another magnified edge portion of a fabricated layer scanned with the pattern of FIG. 1.

An example of an embodiment utilizing control of vector scanning energy beam intensity, vector scanning energy beam scanning speed, vector scanning energy beam focus depth, or any combination thereof as a function of an angle between the plurality of parallel lines and the vector along the contoured edge is depicted in FIG. 5. As shown in FIG. 5, dynamic control of vector scanning energy beam intensity, vector scanning energy beam scanning speed, vector scanning energy beam focus depth, or any combination thereof can produce a smaller melt pool 20a where the angle between the vector along contour edge 14 is relatively small and a larger melt pool 20a where the angle between the vector along contour edge 14 is relatively large.

In some embodiments, the size of the melt pool can be controlled by varying the intensity of the energy beam, with higher intensities producing a larger melt pool and lower intensities producing a smaller melt pool. In some embodiments, the size of the melt pool can be dynamically controlled by varying the scanning speed of the energy beam, with slower scanning speeds producing a larger melt pool and faster scanning speeds producing a smaller melt pool. In some embodiments, the size of the melt pool can also be controlled by varying the focal depth of the energy beam. In some embodiments, both the intensity and the scanning speed of the energy beam can be controlled to produce desired effects. In some embodiments, the above parameters can be varied in tandem (e.g., slower scanning speed combined with higher intensity, or faster scanning speed combined with lower intensity). In some embodiments, the above parameters can be varied against each other (e.g., slower scanning speed combined with lower intensity, or faster scanning speed combined with higher intensity), optionally with one predominating over the other to produce a desired effect.

In some embodiments, vector scanning energy beam intensity, vector scanning energy beam scanning speed, vector scanning energy beam focus depth, or any combination thereof can be dynamically controlled as a function of an angle between the plurality of parallel lines and the vector along the contoured edge is depicted in FIG. 5 toward producing a target melt pool size that is based on the angle between the parallel scanning lines 12 and the scanning vector along the contour edge. In some embodiments, a target melt pool size can be determined by measuring melt pool size on one or more test samples conducted with different levels of energy beam intensity, scanning speed, or focal depth, and storing energy beam intensity, scanning speed, or focal depth parameters as a function of angle between the plurality of parallel lines and the vector along the contoured edge in a lookup table in a controller. A target melt pool size as a function of angle between the parallel raster scan lines and edge contour vector can be determined based on empirical measurements of seam thickness or sub-surface porosity made on test samples. In some embodiments, melt pool diameter can be actively measured during scanning and used to control vector scanning energy beam intensity, vector scanning energy beam scanning speed, vector scanning energy beam focus depth, or any combination thereof with closed loop control based on a comparison of measured melt pool size with the target melt pool size. In some embodiments, vector scanning energy beam intensity, vector scanning energy beam scanning speed, vector scanning energy beam focus depth, or any combination thereof can be dynamically controlled as a function of an angle between the plurality of parallel lines and the vector along the contoured edge is depicted in FIG. 5 without regard for an enumerated melt pool size, for example based on energy beam control parameters stored in a look-up table in a controller based on empirical measurements of seam thickness or sub-surface porosity made on test samples.

Various types of additive manufacturing materials, energy sources, and processes can be used according to the disclosure. The type of additive manufacturing process used depends in part on the type of material out of which it is desired to manufacture an article. In some embodiments, the article is made of metal, and a metal-forming additive manufacturing process can be used. Such processes can include selective laser sintering (SLS) or direct metal laser sintering (DMLS), in which a layer of metal or metal alloy powder is applied to the workpiece being fabricated and selectively sintered according to the digital model with heat energy from a directed laser beam. Another type of metal-forming process includes selective laser melting (SLM) or electron beam melting (EBM), in which heat energy provided by a directed laser or electron beam is used to selectively melt (instead of sinter) the metal powder so that it fuses as it cools and solidifies. In some embodiments, the article is made of a polymer, and a polymer or plastic forming additive manufacturing process can be used. Such process can include stereolithography (SLA), in which fabrication occurs with the workpiece disposed in a liquid photopolymerizable composition, with a surface of the workpiece slightly below the surface. Light from a laser or other light beam is used to selectively photopolymerize a layer onto the workpiece, following which it is lowered further into the liquid composition by an amount corresponding to a layer thickness and the next layer is formed.

It should be noted that SLA processed may require a second type of energy beam for vector scanning along the contour edge for liquefaction and re-solidification of the fused material, different than the energy beam used for photopolymerization. Polymer articles can also be fabricated using selective heat sintering (SHS), which works analogously for thermoplastic powders to SLS for metal powders. Another exemplary additive manufacturing process that can be used for polymers or metals is fused deposition modeling (FDM), in which a metal or thermoplastic feed material (e.g., in the form of a wire or filament) is heated and selectively dispensed onto the workpiece through an extrusion nozzle.

Figure 6:
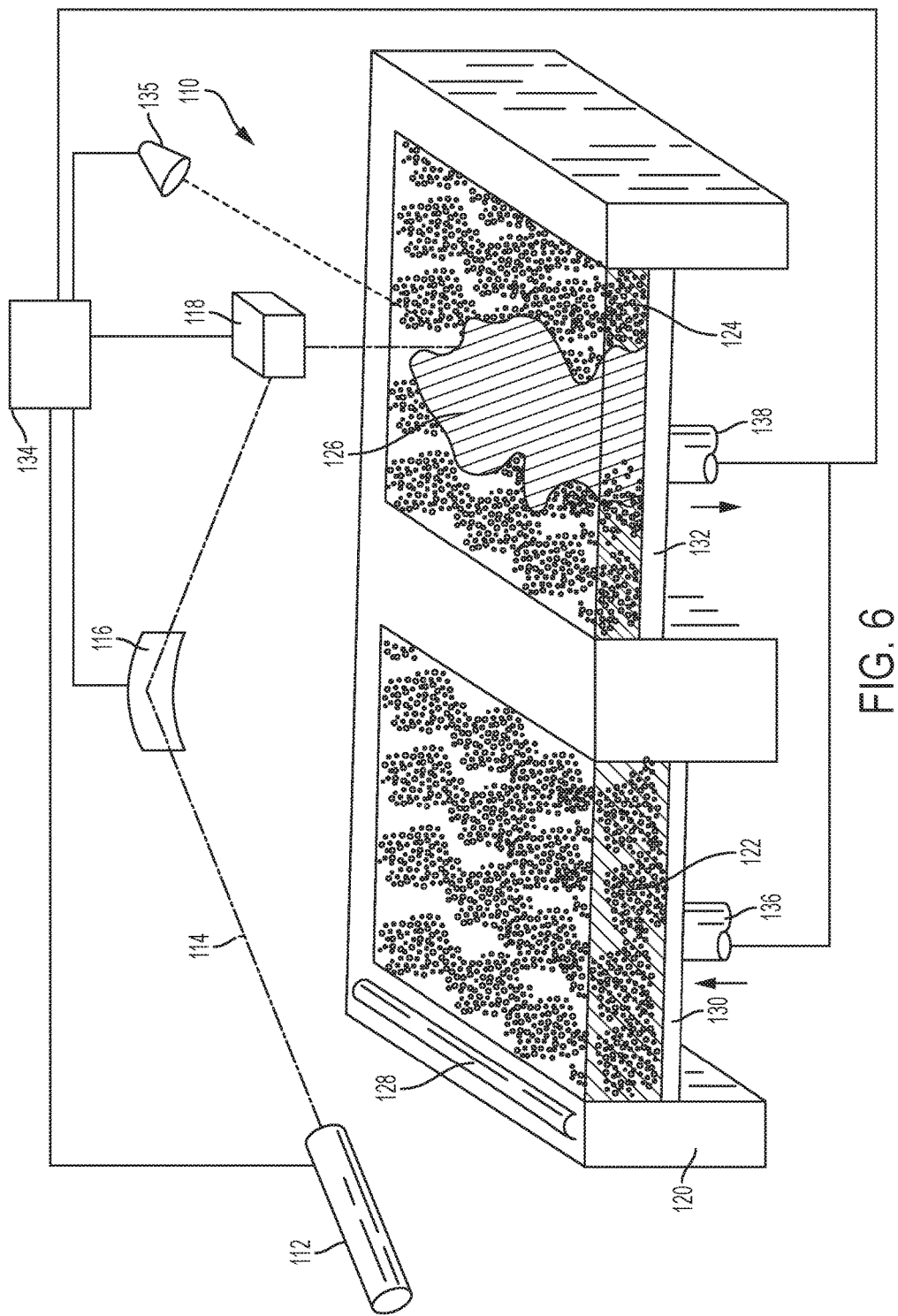
FIG. 6 is a schematic depiction of an example embodiment of an additive manufacturing apparatus.

Many additive manufacturing processes utilize a fusible powder such as a metal powder or a plastic powder. An example embodiment of an apparatus for powder fusion additive manufacturing is schematically depicted in FIG. 6. As shown in FIG. 6, an example of an additive manufacturing system or apparatus 110 includes energy source 112 that generates an energy beam 114, a first wave guide or other optical guide 116 that is used to guide the energy beam, a second wave guide or optical guide 118, a frame 120, a powder supply 122, a powder processing bed 124, sintered powder material 126, a spreader 128, a powder supply support 130, and a stack support 132. A controller 134 is operatively connected to the energy source 112, optical guides 116, 118, spreader 128, optional optical sensor 135, and actuators 136 and 138 for powder supply support 130 and stack support 132, respectively. Of course, the illustration in FIG. 6 is schematic in nature, and many alternative designs of additive manufacturing devices are possible. Various types of additive manufacturing materials, energy sources, powder feed and storage, atmosphere control, and processes can be used to fabricate articles and the individual features thereof that are described herein.

Energy source 112 can be any source capable of creating focused energy. For example, energy source 112 can be a laser or an electron beam generator. Energy source 112 generates an energy beam 114, which is a beam of focused or focusable energy, such as a laser beam or an electron beam. Optical guide 116 such as a mirror is present in some embodiments to deflect radiation in a desired direction. A second optical guide 118, such as an optical head is present in some embodiments, and also directs energy in a desired direction. For example, optical guide 118 can include a mirror and be attached to an x-y positioning device. Frame 120 is used to contain powder material in powder supply 122 and in powder processing bed 124. Powder supply 122 and powder processing bed 124 include powder material, such as or powdered metals. Powder processing bed 124 further includes fused powder 126. Fused powder 126 is powder contained within powder processing bed 124 that has been at least partially sintered or melted. Spreader 128 is a spreading device such as an air knife using an inert gas instead of air, which can transfer powder material from powder supply 122 to powder processing bed 124. The depiction of spreader 128 in FIG. 6 is of course only schematic in nature, and does not depict specific features such as controllably directed air jet nozzles that could be used to remove metal powder from targeted portions of the assembly such as fluid flow passages in the heat exchanger core, without removing metal powder from the first region between the heat exchanger core and the housing. Powder supply support 130 and stack support 132 are used to raise and/or lower material thereon during additive manufacturing.

During operation, energy source 112 generates energy beam 114, which is directed by the optical guides 116 and 118 to the powder processing bed 124. The energy intensity and scanning rate and pattern of the energy beam 114 can be controlled to produce a desired result in the powder processing bed. Optional optical sensor 135 can measure parameters at the build location, for example melt pool size for use in closed loop control by the controller 134 toward producing a target melt pool size during vector scanning along a contour edge. In some aspects, the result can be partial melting of powder particles resulting in a fused structure after solidification such as a sintered powder metal structure having some degree of porosity derived from the gap spaces between fused powder particles. In some aspects, the result from exposure to the energy beam 14 can be complete localized melting and fluidization of the powder particles producing a metal article having a density approaching or equal to that of a cast metal or plastic article. In some aspects, the energy beam provides homogeneous melting such that an examination of the manufactured articles can detect no particle pattern from the original particles. After each layer of the additively manufactured article is completed, powder supply support 130 is moved by actuator 136 to raise the height of powder material supply 122 with respect to frame. Similarly, stack support 132 is moved by actuator 138 to lower the height of article with respect to frame 120. Spreader 28 transfers a layer of powder from powder supply 122 to powder processing bed 124. By repeating the process several times, an object may be constructed layer by layer.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of making an article by scanning a fusible material with an energy beam, comprising
   (a) identifying a scanning pattern comprising a plurality of parallel lines terminating at a contoured edge;
   (b) determining an angle between the parallel lines and a vector along the contoured edge;
   (c) fusing the fusible material with the energy beam applied to the fusible material at a build location according to the scanning pattern;
   (d) applying the energy beam with vector scanning at the build location along the contoured edge to liquefy and re-solidify material at the build location along the contoured edge, and controlling vector scanning energy beam intensity, vector scanning energy beam scanning speed, vector scanning energy beam focus depth, or any combination thereof as a function of the angle between the plurality of parallel lines and the vector along the contoured edge; and
   (e) repeating steps (a)-(d) for successive layers to form the article.

2. The method of claim 1, wherein said controlling of vector scanning comprises increasing vector scanning energy beam intensity with increasing angle between the plurality of parallel lines and the vector along the contoured edge, and decreasing vector scanning energy beam intensity with decreasing angle between the plurality of parallel lines and the vector along the contoured edge.

3. The method of claim 1, wherein said controlling of vector scanning comprises increasing vector scanning energy beam scanning speed with decreasing angle between the plurality of parallel lines and the vector along the contoured edge, and decreasing vector scanning energy beam scanning speed with increasing angle between the plurality of parallel lines and the vector along the contoured edge.

4. The method of claim 1, wherein both vector scanning energy beam intensity and scanning speed are controlled as a function of angle between the plurality of parallel lines and the vector along the contoured edge.

5. The method of claim 1, further comprising determining a target melt pool size as a function of the angle between the plurality of parallel lines and the vector along the contoured edge, and controlling vector scanning energy beam intensity, vector scanning energy beam scanning speed, vector scanning energy beam focus depth, or any combination thereof toward producing the target melt pool size.

6. The method of claim 5, further comprising measuring melt pool size during vector scanning, and controlling vector scanning energy beam intensity, vector scanning energy beam scanning speed, vector scanning energy beam focus depth, or any combination thereof with closed loop control based on a comparison of measured melt pool size with the target melt pool size.

7. The method of claim 1, wherein the fusible material comprises a metal powder or metal alloy powder.

8. The method of claim 1, wherein the fusible material comprises a polymer powder.

9. The method of claim 1, wherein the fusible material comprises a fusible powder, and the build location is a bed comprising the fusible powder.

10. The method of claim 1, wherein the energy beam comprises a laser beam.

11. The method of claim 1, wherein the energy beam comprises an electron beam.

12. An additive manufacturing apparatus, comprising:
a build location for a fusible material;
an energy beam scanning emitter; and
a controller in communication with the energy beam scanning emitter, configured to:
identify a scanning pattern comprising a plurality of parallel lines terminating at a contoured edge;
determine an angle between the parallel lines and a vector along the contoured edge;
apply an energy beam from the energy beam scanning emitter to the fusible material at the build location according to the scanning pattern, and apply an energy beam with vector scanning at the build location along the contoured edge, and to control vector scanning energy beam intensity, vector scanning energy beam scanning speed, vector scanning energy beam focus depth, or any combination thereof as a function of the angle between the plurality of parallel lines and the vector along the contoured edge.

13. The apparatus of claim 12, wherein the controller is configured to increase vector scanning energy beam intensity with increasing angle between the plurality of parallel lines and the vector along the contoured edge, and to decrease vector scanning energy beam intensity with decreasing angle between the plurality of parallel lines and the vector along the contoured edge.

14. The apparatus of claim 12, wherein the controller is configured to increase vector scanning energy beam scanning speed with decreasing angle between the plurality of parallel lines and the vector along the contoured edge, and to decrease vector scanning energy beam scanning speed with increasing angle between the plurality of parallel lines and the vector along the contoured edge.

15. The apparatus of claim 12, wherein the controller is configured to control both vector scanning energy beam intensity and scanning speed as a function of angle between the plurality of parallel lines and the vector along the contoured edge.

16. The apparatus of claim 12, wherein the controller is configured to determine a target melt pool size as a function of an angle between the plurality of parallel lines and the vector along the contoured edge, and to control vector scanning energy beam intensity, vector scanning energy beam scanning speed, vector scanning energy beam focus depth, or any combination thereof to produce the target melt pool size.

17. The apparatus of claim 16, further comprising a sensor in communication with the controller for measuring melt pool size at the build location, and wherein the controller is configured to control vector scanning energy beam intensity, vector scanning energy beam scanning speed, vector scanning energy beam focus depth, or any combination thereof with closed loop control based on a comparison of measured melt pool size at the build location with the target melt pool size.

18. The apparatus of claim 12, wherein the energy beam is a laser beam.

19. The apparatus of claim 12, wherein the energy beam is an electron beam.

20. The apparatus of claim 12, wherein the apparatus is a direct laser sintering apparatus, a direct laser melting apparatus, a selective laser sintering apparatus, a selective laser melting apparatus, an electron beam melting apparatus, a direct metal deposition apparatus, or a stereolithographic apparatus.

* * * * *